United States Patent [19]
Mullins

[11] Patent Number: 5,853,057
[45] Date of Patent: Dec. 29, 1998

[54] AUXILIARY WHEEL CONVERSION ASSEMBLY FOR A MOTORCYCLE

[76] Inventor: Raymond Mullins, 23632 Rte. 113, Wilmington, Ill. 60481

[21] Appl. No.: 798,582

[22] Filed: Feb. 10, 1997

[51] Int. Cl.[6] .................................................. B62K 27/12
[52] U.S. Cl. ............................. 180/16; 180/209; 180/21; 280/204; 280/767
[58] Field of Search ............................... 180/16, 209, 210, 180/211, 215, 219, 216, 21, 11, 12, 15; 280/272, 79.4, 282, 767, 204, 755, 293

[56] References Cited

U.S. PATENT DOCUMENTS

| | | | |
|---|---|---|---|
| 994,715 | 6/1911 | Brazil | 280/293 |
| 1,145,682 | 7/1915 | Havenstein | 180/16 |
| 1,283,636 | 11/1918 | Bennett | 180/21 |
| 1,311,816 | 7/1919 | Heintz | 280/204 |
| 1,855,172 | 4/1932 | Hess | 280/293 |
| 3,498,633 | 3/1970 | Hopkins | 280/204 |
| 4,511,155 | 4/1985 | Galloway | 280/204 |
| 4,513,837 | 4/1985 | Archer | 180/209 |
| 4,685,691 | 8/1987 | Tremblay | 280/204 |
| 5,518,259 | 5/1996 | Hall | 180/21 |

FOREIGN PATENT DOCUMENTS

| | | | |
|---|---|---|---|
| 523981 | 3/1930 | Germany | 180/21 |
| 586047 | 8/1931 | Germany | 180/21 |
| 477554 | 1/1953 | Italy | 180/209 |

*Primary Examiner*—Brian L. Johnson
*Assistant Examiner*—Gary Savitt
*Attorney, Agent, or Firm*—Ernest Kettelson

[57] ABSTRACT

An auxiliary wheel conversion assembly for a motorcycle comprises a quick connect and disconnect structure, including a generally U-shaped frame having side frame members on opposite sides of a receiving pocket to receive the rear drive wheel of the motorcycle when connected thereto, a cross-bar across the rear between the two side frame members, an auxiliary wheel mounted along and to the outside of each side frame member, such wheels being of the same size as the rear drive wheel and substantially in axial alignment therewith when the conversion assembly is connected to the motorcycle.

5 Claims, 7 Drawing Sheets

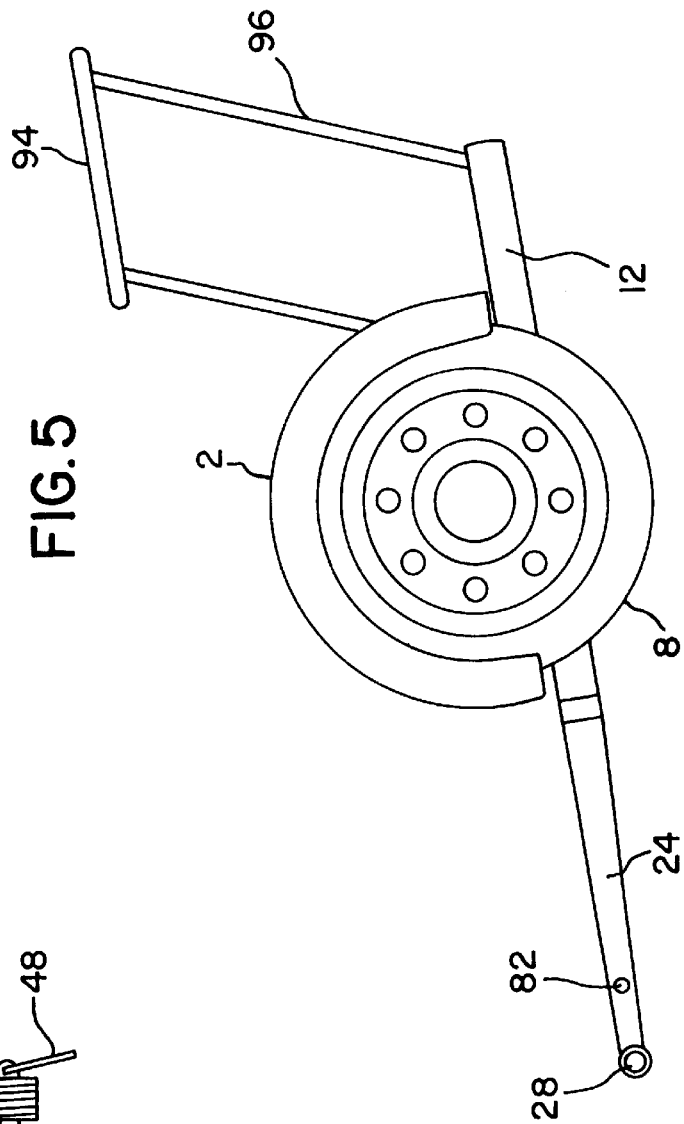
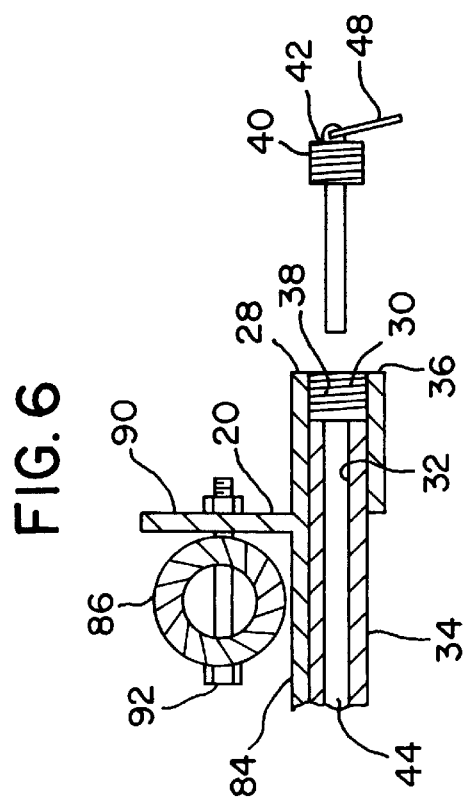
FIG. 5
FIG. 6

AUXILIARY WHEEL CONVERSION ASSEMBLY FOR A MOTORCYCLE

FIELD OF THE INVENTION

This invention relates to the field of auxiliary wheel conversion assemblies for motorcycles whereby they can be converted from a conventional two wheel motorcycle into a tricycle type of vehicle. The conversion assembly in this case can be easily and quickly connected to a motorcycle for use as a tricycle type vehicle, then just as easily and quickly disconnected for use as a conventional two wheel motorcycle.

BACKGROUND OF THE INVENTION

Prior art of which the inventor is aware include the devices and assemblies which are shown and described in the following United States Patents:

U.S. Pat. No. 5,529,141 for a kit for converting a motorcycle to a tricycle.
U.S. Pat. No. 5,499,689 for a motorcycle conversion rear axle mounting system.
U.S. Pat. No. 4,697,659 for a vehicle fraction attachment.
U.S. Pat. No. 4,287,960 for a motorcycle conversion kit.
U.S. Pat. No. 4,133,402 for a two wheel motorized vehicle side wheel outrigger assembly. No. 3,767,000 for a motorcycle with auxiliary wheel.
U.S. Pat. No. 3,419,098 for a three wheeled automotive vehicle.
U.S. Pat. No. 2,889,891 for auxiliary wheel supports for vehicles.
U.S. Pat. No. 1,956,319 for a convertible motorcycle chassis.
U.S. Pat. No. 1,933,102 for a motor tricycle.
U.S. Pat. No. 1,279,070 for a tractor attachment.
U.S. Pat. No. 1,152,821 for a motor vehicle.

Prior art conversion kits and assemblies for converting a two wheel motorcycle into a tricycle type vehicle have a number of disadvantages. Many of them require removal of the rear drive wheel of the motorcycle and connection of the drive mechanism to the wheels of the conversion assembly. Others require extensive connection of the conversion assembly to the motorcycle making it difficult if not impractical to change back for use as a conventional two wheel motorcycle. Some of the prior art devices require permanent connection of the conversion kits to the motorcycle, with pivot arm assemblies to pivot the auxiliary wheels out for use of the auxiliary wheels and to pivot them back alongside the motorcycle when it is desired to use as a two wheel motorcycle. In such cases, the auxiliary wheels must of necessity be smaller than the auxiliary wheels so they do not come into contact with the ground when pivoted to their out-of-use position alongside the motorcycle.

SUMMARY OF THE INVENTION

The auxiliary wheel conversion assembly in accordance with the present invention is constructed in such a way that it can be quickly and easily connected to and disconnected from a motorcycle. The auxiliary wheels can be and are as large as the rear drive wheel of the motorcycle, and are preferably the same size as the motorcycle's rear drive wheel.

The conversion assembly is of lightweight and simplified construction, comprising a frame having a pair of spaced apart side members, which extend parallel to each other on opposite sides of a receiving space for the rear drive wheel of the motorcycle, then having diagonal portions which extend forwardly from that point to converge toward each other, terminating at forward ends which are spaced apart more closely than the rearwardly facing ends of the side frame members. A cross-bar extends across the rear of the conversion assembly from the rearward facing end of one side member to the rearward facing end of the other.

A connection plate is mounted to the lower and forward portion of the motorcycle frame, having laterally extending tubular insert members. Corresponding sleeve members are provided at the forward ends of each side frame member to receive the insert members of the connection plate secured to the motorcycle frame, thereby connecting the conversion assembly to the motorcycle. Locking pins are provided to screw into an internally threaded portion of the sleeve members, such locking pins having shaft portions which extend into cylindrical bores of the tubular insert members of the connection plate received in the sleeves at the ends of the side frame members of the conversion assembly.

Additional coupling lugs are connected to a portion of the motorcycle frame just forward of the rear drive wheel and on each side of the motorcycle, and lug coupling or lug receiving brackets are connected to the inside of each side frame member of the conversion assembly, extending inwardly thereof far enough to come into registration with the coupling lugs when the rear drive wheel of the motorcycle is received in the receiving space of the conversion assembly. The lug receiving brackets are secured to the side frame members at a location thereon which will seat the coupling lugs in the brackets at such time as the rear drive wheel of the motorcycle is received in the said receiving space and the insert members on the forwardly positioned connection plate are in registration with the sleeve members at the forward ends of the side frame members of the conversion assembly for reception therein.

The conversion assembly has its own braking system, including a brake pedal which is positioned to lie adjacent the brake pedal of the motorcycle when the conversion assembly is connected to the motorcycle. Thus, both can be depressed at the same time to apply the brakes of the motorcycle and of the auxiliary wheel conversion assembly simultaneously.

A more detailed description of the auxiliary wheel conversion assembly in accordance with this invention is set forth in the description of preferred embodiment section hereinbelow.

BRIEF DESCRIPTION OF THE DRAWING

FIG. 5 is a larger side elevation view of the auxiliary wheel conversion assembly to more clearly show the parts thereof that can be seen from the left-hand side.

FIG. 6 is an enlarged cross-section of a connection sleeve member of the auxiliary wheel conversion assembly and of one of the insert ends of the connection assembly which is secured to the frame of the motorcycle, the insert end shown received in the sleeve member of the conversion assembly.

DESCRIPTION OF PREFERRED EMBODIMENT

Figure 1:
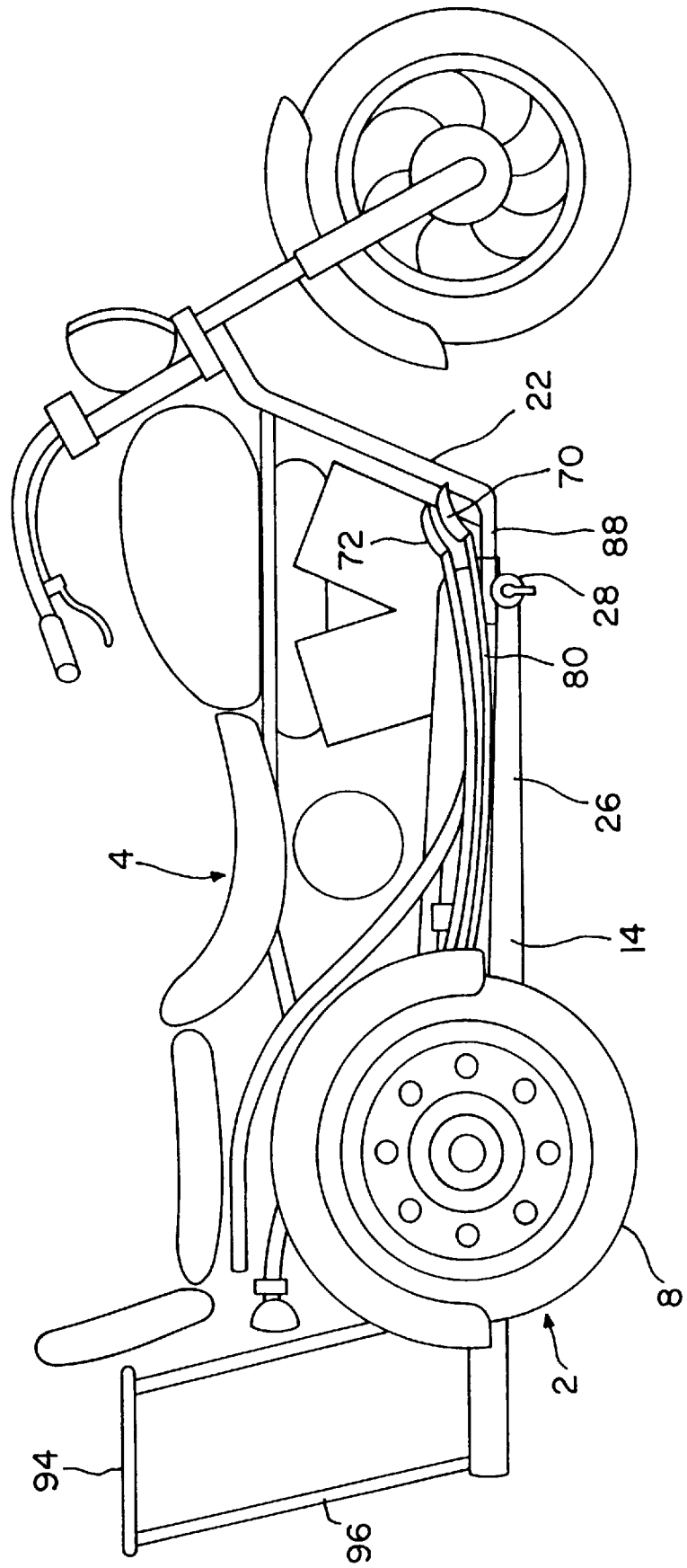
FIG. 1 is a side elevation of a motorcycle having an auxiliary wheel conversion assembly in accordance with this invention connected thereto.
Figure 2:
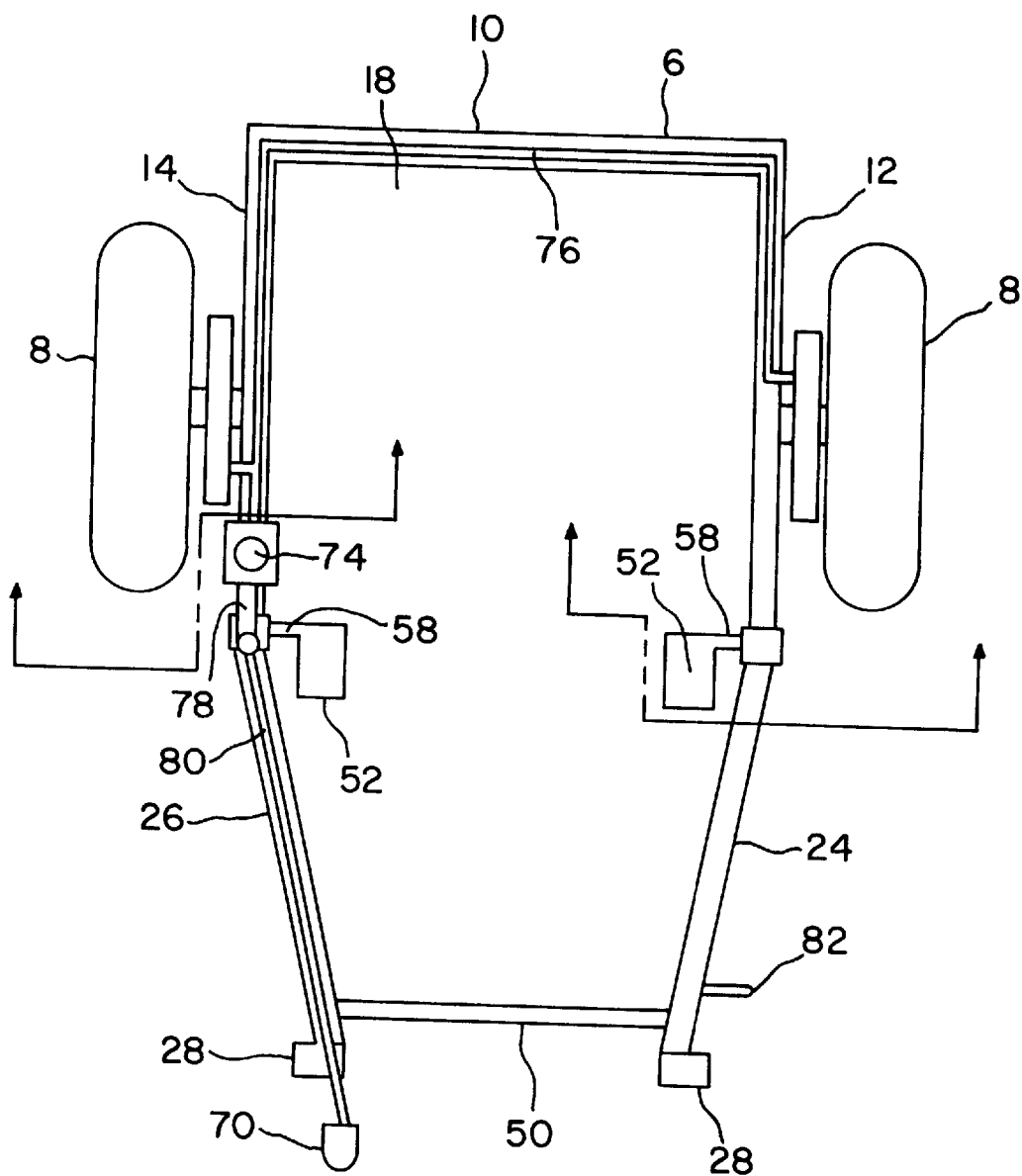
FIG. 2 is a top plan view of the auxiliary wheel conversion assembly shown disconnected from the motorcycle.
Figure 3:
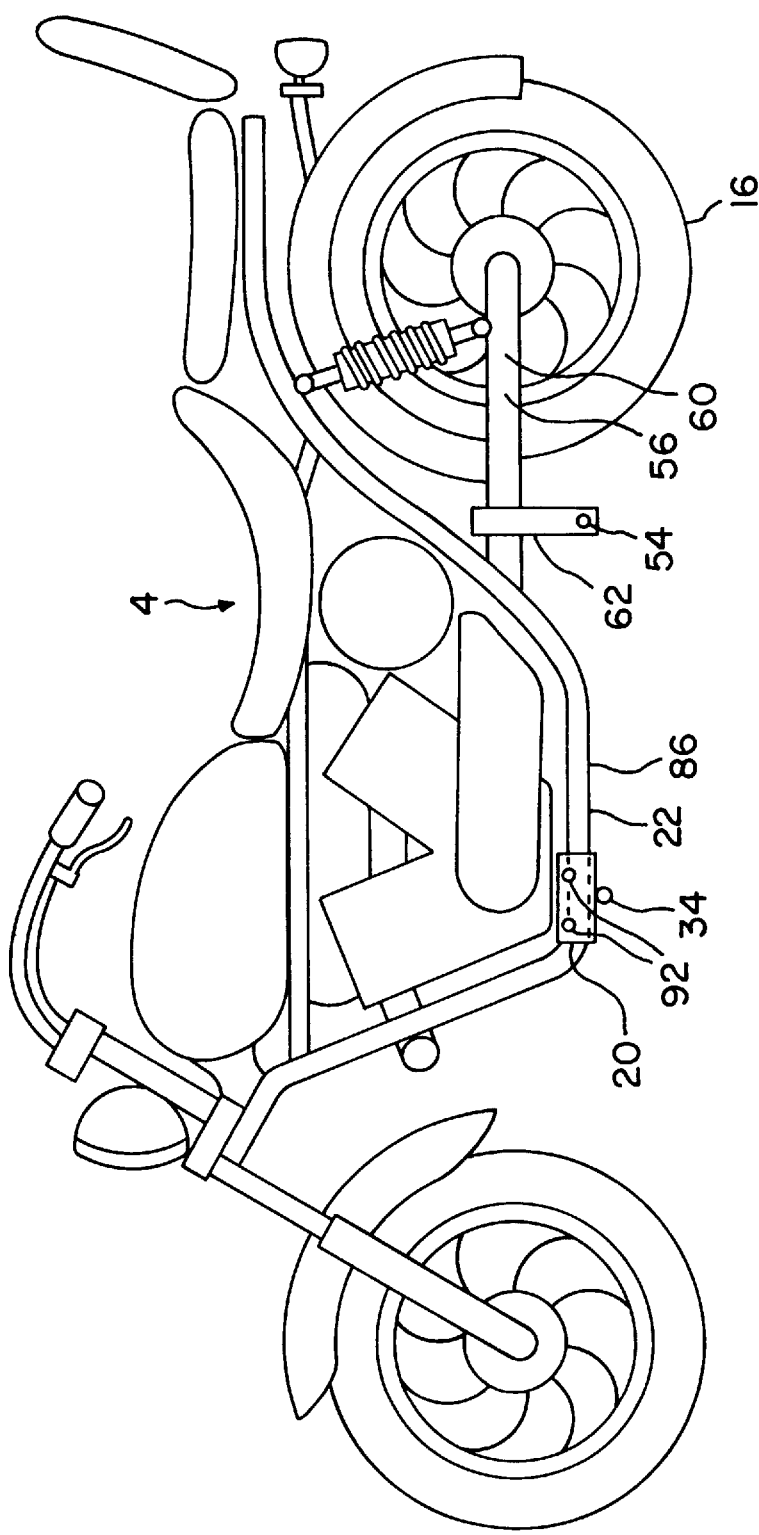
FIG. 3 is a side elevation view of a motorcycle to illustrate the cooperative connection members secured to the motorcycle to enable quick releasable connection of the auxiliary wheel conversion assembly to the motorcycle.
Figure 4:
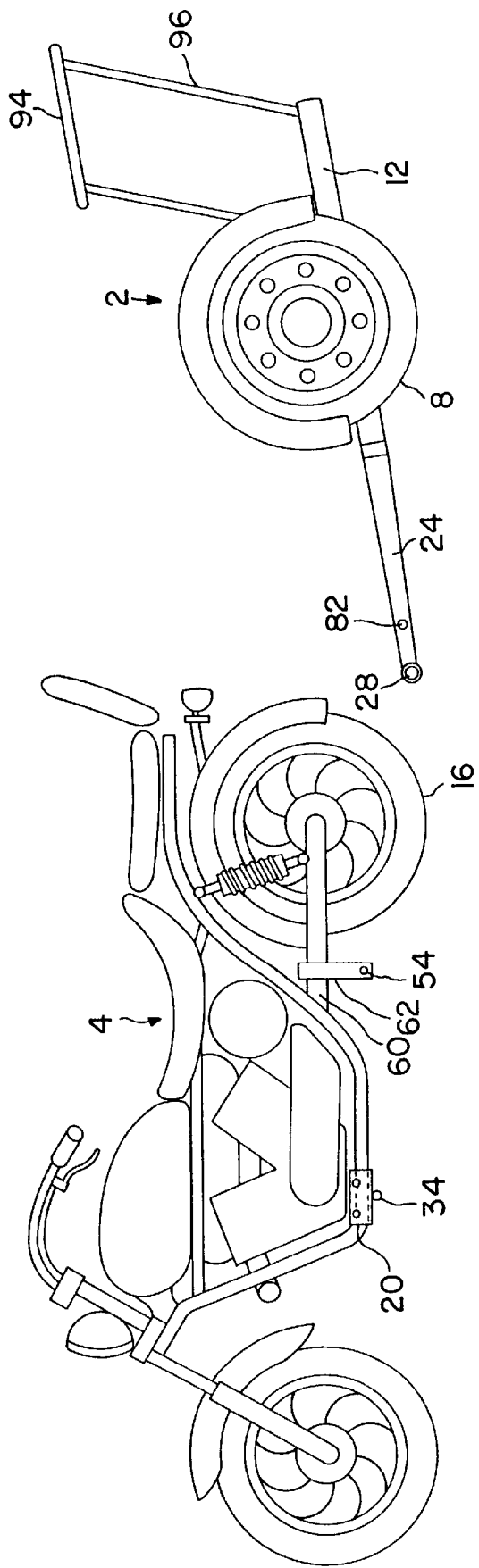
FIG. 4 is a side elevation view of the auxiliary wheel conversion assembly in position behind the motorcycle just prior to bringing the two together for connection of the conversion assembly to the motorcycle.
Figure 7:
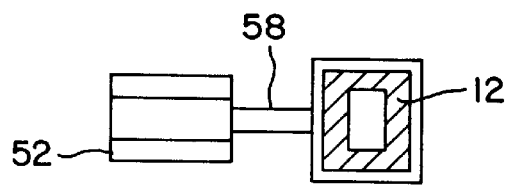
FIG. 7 is an enlarged end view from the front of one of the U-shaped brackets of the auxiliary wheel conversion assembly connected to one of the conversion assembly's side frame members (shown in section).
Figure 8:
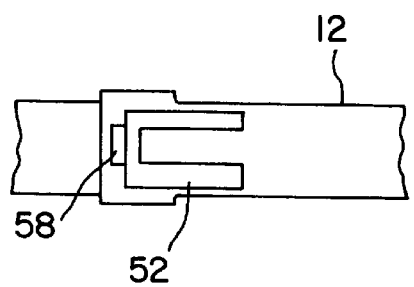
FIG. 8 is a side elevation view of the U-shaped bracket shown in FIG. 7.
Figure 9:
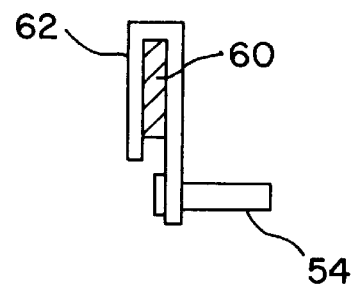
FIG. 9 is an end view from the front of the lug supporting bracket connected to one of the motorcycle's rear wheel mounting frame side legs (shown in section), and showing the connecting lug on such bracket which is received in the U-shaped bracket shown in FIGS. 7 and 8 of the conversion assembly when it is connected to the motorcycle.
Figure 10:
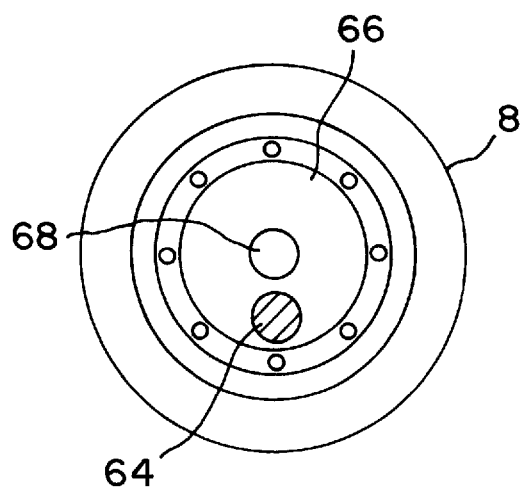
FIG. 10 is a view of one of the wheels of the auxiliary wheel conversion assembly showing the inwardly facing side which faces inwardly of the conversion assembly, showing the wheel support shaft in section which connects the wheel to the conversion assembly.
Figure 11:
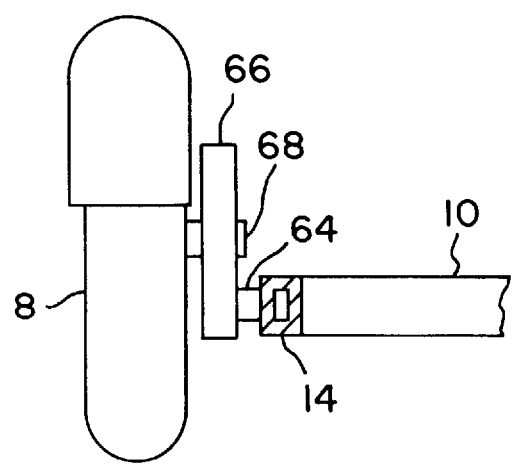
FIG. 11 is a partial end view from the front of the right-hand side wheel of auxiliary wheel conversion assembly to more clearly show its connection to the frame of the conversion assembly.

A tricycle conversion assembly 2 for a motorcycle 4 in accordance with this invention comprises a generally U-shaped frame 6 having a pair of outboard auxiliary wheels 8 which can be easily connected to and disconnected from the motorcycle to convert it into a tricycle type vehicle when connected and to return to a conventional two wheel motorcycle when disconnected.

The U-shaped frame 6 includes a laterally extending cross-bar 10 across the rear of the conversion assembly 2, a first longitudinally extending side leg 12 which extends along the left hand side of the motorcycle when connected, and a second longitudinally extending side leg 14 which extends along the right hand side of the motorcycle when connected thereto. The rear drive wheel 16 of the motorcycle is received in the receiving space 18 of the frame 6 between the spaced apart side legs 12 and 14 when the conversion assembly 2 is connected to the motorcycle 4.

Each side leg 12 and 14 extend forwardly from opposite ends of the cross-bar 10 in substantially parallel relationship for a distance somewhat greater than the diameter of the rear drive wheel 16 whereupon they converge inwardly toward their respective connection points with a connection assembly 20 secured to the lower mid-portion of the motorcycle frame 22.

Side leg 12 includes the inwardly converging diagonal leg portion 24 and side leg 14 includes the inwardly converging diagonal leg portion 26. The diagonal leg portions 24 and 26 each terminate forwardly with an integrally formed laterally extending connecting sleeve 28 having a through passageway 30 to receive corresponding insert end 32 of laterally extending, tubular connection bar 34 of connection assembly 20 secured to the lower midportion of the motorcycle frame 22.

The integrally formed connecting sleeves 28 at the forward end of the diagonal side leg portions 24 and 26 are cylindrical. The inner diameter of their through passageway 30 corresponds to the outer diameter of the insert ends 32 of the tubular connection bar 34 for snug reception of the insert ends 32 into respective ones of the through passageway 30 of the connecting sleeves 28. The connecting sleeves are preferably about two to three inches long from end to end, and the insert ends 32 extend into the sleeves 28 most of that distance.

However, the outer end 36 of each connecting sleeve 28 includes an integrally threaded portion 38 for threaded engagement with the externally threaded portion 40 of connecting and locking pins 42. The connection bar 34 and its insert ends 32 are cylindrical and include a bore or through passageway 44 therethrough. The connecting and locking pins 42 each include a cylindrical insert shaft 46 which extends into the bore 44 of each insert end 32 when each locking pin 42 is screwed into threaded engagement of its externally threaded portion 40 with internally threaded portion 38 of the connecting sleeves 28.

Each locking pin 42 includes a handle 48 pivotally connected to its outer end.

The U-shaped frame 6 also includes a front cross-bar 50 extending across between the diagonal side leg portions 24 and 26 and secured thereto at a location inwardly a short distance from their forward ends.

The frame 6 of the conversion assembly is additionally connected to the motorcycle by a pair of U-shaped brackets 52 on the conversion assembly with their open ends facing forwardly to receive a corresponding pair of connecting lugs 54 extending laterally outwardly from opposite sides of the motorcycle's rear wheel mounting frame 56.

The U-shaped brackets 52 are each connected to respective ones of the side legs 12 and 14 by a connecting bar 58 extending laterally and inwardly thereof into the receiving space 18 between the side legs 12 and 14, and at a location rearwardly from the inwardly converging diagonal side leg portions 24 and 26.

The corresponding pair of connecting lugs 54 are connected to respective ones of the longitudinally extending side arm members 60 of the rear wheel mounting frame 56 by a bracket 62 bolted thereto and from which the lugs 54 project laterally and outwardly.

The auxiliary wheels 8 are connected to the frame 6 of the converging assembly 2 as follows. A pair of wheel support shafts 64 project outwardly from respective ones of the side legs 12 and 14 at a location thereon about midway between the rear cross-bar 10 and the beginning of the inwardly converging diagonal side leg portions 24 and 26. A cylindrical brake drum assembly 66 is secured to each of the wheel support shafts at a location radially offset from the center of the brake drum assembly on a radius which extends vertically and downward from the center.

A rotatable axle 68 extends outwardly from each of the brake drum assemblies 66 on which respective ones of the pair of auxiliary wheels 8 are mounted for rotation.

The conversion assembly 2 includes its own separate braking system to brake the auxiliary wheels 8, including a separate auxiliary brake pedal 70 which is positioned on the conversion assembly in such a way that it lies next to the motorcycle brake pedal 72 when the conversion assembly is connected to the motorcycle. The rider can then depress both brake pedals 70 and 72 at the same time with his foot to apply braking force simultaneously to the auxiliary wheels 8 and rear drive wheel 16 of the motorcycle. The braking system of the conversion assembly includes a fluid pressure assembly 74, tubular supply lines 76 leading from the fluid pressure assembly 74 to the brake drum assemblies 66, a piston rod 78 extends from said fluid pressure assembly, and a connecting shaft 80 connected at one end to piston rod 78 and at the other end to the auxiliary brake pedal 70 for operating the piston to apply fluid pressure to the brake drum assemblies 66 for braking the auxiliary wheels 8 when the brake pedal 70 is depressed and to release the braking pressure when pressure on brake pedal 70 is released.

A hand grasp 82 is provided along the diagonally extending side leg portion 24 of side leg 12 of the conversion assembly frame 6, extending laterally outward for a user to grasp and pull the conversion assembly forward into position for connecting to the motorcycle.

The tricycle conversion assembly 2 in accordance with the present invention is easily connected to and disconnected from a motorcycle.

To connect to a motorcycle, the conversion assembly is pulled up behind the rear drive wheel 16 of the motorcycle with the forward spaced apart ends of the side legs 12 and 14 of conversion assembly frame 6 facing the rear drive wheel 16 and positioned to receive it therebetween into the receiving space 18 between the frame side legs 12 and 14.

The connection assembly 20, if not previously connected, is then connected to the lower portion of the motorcycle frame 22. The connection assembly 20 comprises a laterally extending plate 84 which extends across from frame member 86 to frame member 88 of the motorcycle frame 22 when positioned in place at the forward lowermost portion of the motorcycle frame 22. A flange 90 extends upwardly from the plate 84 at each opposite end in facing relationship to respective ones of the frame members 86 and 88 of the motorcycle frame 22 to secure the connection assembly 20 thereto by tightening the bolts 92 which extend through respective ones of the frame members 86 and 88 and through respective ones of flanges 90.

Also, if not previously connected to the motorcycle, the connecting lugs 54 and their brackets 62 are secured to respective ones of the side arm members 60 of the rear motorcycle wheel mounting frame 56, at the location thereon which will seat the connecting lugs 54 in the receiving recesses of respective ones of the U-shaped brackets 52 extending inwardly from side legs 12 and 14 of the conversion assembly frame 6 when the insert ends 32 of connecting bar 34 of the connection assembly 20 secured to a forward portion of the motorcycle frame are in position for reception in the connecting sleeves 28 at the forward ends of the conversion assembly side legs 12 and 14.

The rear wheel 16 of the motorcycle is then backed over the front cross-bar 50 of the conversion assembly frame 6 into the receiving space 18 between the side legs 12 and 14 of the conversion assembly frame until the rear wheel 6 of the motorcycle is substantially in axial alignment with the auxiliary wheels 8 of the conversion assembly 2. The person connecting the assembly to the motorcycle then grasps the hand grasp 82 to move the conversion assembly forwardly or rearwardly whatever slight amount necessary for the connecting sleeves 28 at the forward ends of the conversion assembly side legs 12 and 14 to line up with the insert ends 32 of the connecting bar 34 on the connection assembly 20 secured to the motorcycle frame 22. The insert ends 32 are then inserted into the connecting sleeves 28 at which time the connecting lugs 54 secured to the side arm members 60 on each side of the rear motorcycle wheel mounting frame 56 become seated in the receiving recesses of the U-shaped brackets 52 extending inwardly from a rearward portion of the conversion assembly side legs 12 and 14.

Each of the connecting and locking pins 42 are then screwed in place, by inserting their insert shaft 46 in the bore of respective ones of the tubular insert ends 32 of connecting bar 34 and by threadedly engaging the external threaded portion 40 of the locking pins 42 with the internally threaded portion 38 of respective ones of the connecting sleeves 28.

The tricycle conversion assembly 2 is now securely connected and ready for operating the motorcycle as a tricycle type vehicle, powered by the rear drive wheel 16 of the motorcycle. A luggage carrier 94 is mounted at the rear of the conversion assembly 2 by legs 96 connected at their lower end to the rear cross-bar 10 and to the carrier platform 98 at the their upper end.

To disconnect the conversion assembly 2 from the motorcycle is equally quick and easy to do. The locking pins 42 are unscrewed and the connecting sleeves 28 are separated from the insert ends 32 of the connecting bar 34 on the connection assembly 20 secured to the motorcycle frame. The motorcycle can then be moved forwardly whereupon the connecting lugs 54 secured to each side of the motorcycle rear wheel mounting frame 56 forwardly of the rear drive wheel 16, slip out from the receiving recesses of the U-shaped brackets 52 on the inward sides of the conversion assembly side legs 12 and 14. The motorcycle is then completely disconnected from the conversion assembly 2 for use as a conventional two wheel motorcycle.

The connection assembly 20 and the connecting lugs 54 can remain connected to the motorcycle when being used as a conventional two wheel motorcycle. The conversion assembly 2 can then be quickly and easily re-connected to the motorcycle when it is desired to use it as a tricycle type vehicle.

When the conversion assembly 2 is connected to the motorcycle as described, no additional connecting braces or other connecting members are required. The spaces between the rear drive wheel 16 of the motorcycle and the side legs 12 and 14 of the conversion assembly 2 spaced apart on opposite sides of the rear drive wheel are in fact unobstructed. There is nothing across such spaces that has to be connected and disconnected when connecting and disconnecting the conversion assembly to and from the motorcycle.

I claim:

1. An auxiliary wheel conversion assembly for a motorcycle in combination with a motorcycle, comprising an auxiliary wheel conversion assembly having a pair of spaced apart wheels, a receiving space between said pair of spaced apart wheels, a motorcycle having a rear drive wheel, said rear drive wheel being receivable in said receiving space and movable out thereof, releasable connection means operable between a connected position and a disconnected position to connect said auxiliary wheel conversion assembly to said motorcycle when in said connected position and to disconnect said auxiliary wheel conversion assembly from said motorcycle when in said disconnected position, said releasable connection means being operable to said connected position when said rear drive wheel of said motorcycle has been received in said receiving space, wherein said auxiliary wheel conversion assembly includes a frame, said frame includes a first longitudinally extending side member along one side of said receiving space, a second longitudinally extending side member along the opposite side of said receiving space, wherein said first and second longitudinally extending side members of said frame each include inwardly converging portions as they extend forwardly, including a first inwardly converging diagonal leg portion extending forwardly of said first longitudinally extending side member beginning at a first side member location, and a second inwardly converging diagonal leg portion extending forwardly of said second longitudinally extending side member beginning at a second side member location, wherein said first side member location of said first longitudinally extending side member and said second side member location of said second longitudinally extending side member are forward of said rear drive wheel of said motorcycle when said auxiliary wheel conversion assembly is connected to said motorcycle with said rear drive wheel received in said receiving space of said auxiliary wheel conversion assembly, wherein said first and second inwardly converging diagonal leg portions extend forwardly to each terminate at respective first and second forwardly facing ends, a first cooperative connection member at said first forwardly facing end of said first diagonal leg portion, and a second cooperative connection member at said second forwardly facing end of said second diagonal leg portion, and corresponding cooperative connection means on said motorcycle for releasable connection of said first and second cooperative connection members thereto, said first and second cooperative connection members and said corresponding cooperative connection means on said motorcycle being comprised in said releasable connection means, wherein said motorcycle includes a main frame having a forward lower portion, said corresponding cooperative connection means on said motorcycle comprises a laterally extending connection member secured to said forward lower portion said main frame of said motorcycle, said laterally extending connection member including a first laterally extending interconnection member extending outwardly therefrom on one side, a second laterally extending interconnection member extending outwardly therefrom on the other side thereof, said first cooperative connection member of said first diagonal leg portion of said conversion assembly frame being releasably connectable to said first interconnection member of said laterally extending connection member secured to said frame of said motorcycle, said second cooperative connection member of said second diagonal leg portion of said conversion assembly frame being releasably connectable to said second interconnection member of said laterally extending connection member secured to said frame of said motorcycle, wherein said first and second cooperative connection members at said forwardly facing ends of said first and second diagonal leg portions of said conversion assembly frame each comprise a laterally extending sleeve member, and said first and second laterally extending interconnection members of said laterally extending connection member secured to said frame of said motorcycle each comprise a laterally extending insert member receivable in and releasably connectable to respective ones of said sleeve members.

2. An auxiliary wheel conversion assembly for a motorcycle in combination with a motorcycle as set forth in claim 1, wherein each of said insert members are cylindrical and include a cylindrical bore, each of said sleeve members are cylindrical and include a cylindrical through passageway having an internal diameter corresponding in dimension to the external diameter of said cylindrical insert members for snug reception of said insert members into respective corresponding ones of said sleeve members.

3. An auxiliary wheel conversion assembly for a motorcycle in combination with a motorcycle comprising an auxiliary wheel conversion assembly having a pair of spaced apart wheels, a receiving space between said pair of spaced apart wheels, a motorcycle having a rear drive wheel, said rear drive wheel being receivable in said receiving space and movable out thereof, releasable connection means operable between a connected position and a disconnected position to connect said auxiliary wheel conversion assembly to said motorcycle when in said connected position and to disconnect said auxiliary wheel conversion assembly from said motorcycle when in said disconnected position, said releasable connection means being operable to said connected position when said rear drive wheel of said motorcycle has been received in said receiving space, wherein said auxiliary wheel conversion assembly includes a frame, said frame includes a first longitudinally extending side member along one side of said receiving space, a second longitudinally extending side member along the opposite side of said receiving space, wherein said first and second longitudinally extending side members of said frame each include inwardly converging portions as they extend forwardly, including a first inwardly converging diagonal leg portion extending forwardly of said first longitudinally extending side member beginning at a first side member location, and a second inwardly converging diagonal leg portion extending forwardly of said second longitudinally extending side member beginning at a second side member location, wherein said first side member location of said first longitudinally extending side member and said second side member location of said second longitudinally extending side member are forward of said rear drive wheel of said motorcycle when said auxiliary wheel conversion assembly is connected to said motorcycle with said rear drive wheel received in said receiving space of said auxiliary wheel conversion assembly, wherein said first and second inwardly converging diagonal leg portions extend forwardly to each terminate at respective first and second forwardly facing ends, a first cooperative connection member at said first forwardly facing end of said first diagonal leg portion, and a second cooperative connection member at said second forwardly facing end of said second diagonal leg portion, and corresponding cooperative connection means on said motorcycle for releasable connection of said first and second cooperative connection members thereto, said first and second cooperative connection members and said corresponding cooperative connection means on said motorcycle being comprised in said releasable connection means, wherein said motorcycle includes a main frame having a forward lower portion, said corresponding cooperative connection means on said motorcycle comprises a laterally extending connection member secured to said forward lower portion of said main frame of said motorcycle, said laterally extending connection member including a first laterally extending interconnection member extending outwardly therefrom on one side, a second laterally extending interconnection member extending outwardly therefrom on the other side thereof, said first cooperative connection member of said first diagonal leg portion of said conversion assembly frame being releasably connectable to said first interconnection member of said laterally extending connection member secured to said frame of said motorcycle, said second cooperative connection member of said second diagonal leg portion of said conversion assembly frame being releasably connectable to said second interconnection member of said laterally extending connection member secured to said frame of said motorcycle, wherein said first and second cooperative connection members at said forwardly facing ends of said first and second diagonal leg portions of said conversion assembly frame each comprise a laterally extending sleeve member, and said first and second laterally extending interconnection members of said laterally extending connection member secured to said frame of said motorcycle each comprise a laterally extending insert member receivable in and releasably connectable to respective ones of said sleeve members, wherein each of said insert members are cylindrical and include a cylindrical bore, each of said sleeve members are cylindrical and include a cylindrical though passageway having an internal diameter corresponding in dimension to the external diameter of said cylindrical insert members for snug reception of said insert members into respective corresponding ones of said sleeve members, wherein each of said sleeve members include an outwardly facing end, a portion of said through passageway of each of said sleeve members extending inwardly from said outwardly facing end having internal threads to constitute an internally threaded sleeve portion, said releasable connection means including first and second pins, each of said first and second pins having an outer externally threaded pin portion and a shaft portion extending from said threaded pin portion to terminate at an inwardly facing free end, said shaft portion of each of said first and second pins being receivable in said cylindrical bore of respective ones of said insert members when said insert members are received in respective ones of said sleeve members, said externally threaded pin portion of each of said pins being then threadedly engaged with said internally threaded sleeve portions of respective ones of said sleeve members.

4. An auxiliary wheel conversion assembly for a motorcycle in combination with a motorcycle, comprising an auxiliary wheel conversion assembly having a pair of spaced apart wheels, a receiving space between said pair of spaced apart wheels, a motorcycle having a rear drive wheel, said rear drive wheel being receivable in said receiving space and movable out thereof, releasable connection means operable between a connected position and a disconnected position to connect said auxiliary wheel conversion assembly to said motorcycle when in said connected position and to disconnect said auxiliary wheel conversion assembly from said motorcycle when in said disconnected position, said releasable connection means being operable to said connected position when said rear drive wheel of said motorcycle has been received in said receiving space, wherein said motorcycle includes a first wheel braking system therefor including a first brake pedal located for operation by the foot of a rider, said auxiliary wheel conversion assembly includes a second wheel braking system therefor including a second brake pedal located adjacent to said first brake pedal of said first wheel braking system for contact and operation of said second wheel braking system by the foot of said rider when his said foot contacts said first brake pedal for operation of said first braking system.

5. An auxiliary wheel conversion assembly for a motorcycle in combination with a motorcycle, comprising an auxiliary wheel conversion assembly having a pair of spaced apart wheels, a receiving space between said pair of spaced apart wheels, a motorcycle having a rear drive wheel, said rear drive wheel being receivable in said receiving space and movable out thereof, releasable connection means operable between a connected position and a disconnected position to connect said auxiliary wheel conversion assembly to said motorcycle when in said connected position and to disconnect said auxiliary wheel conversion assembly from said motorcycle when in said disconnected position, said releasable connection means being operable to said connected position when said rear drive wheel of said motorcycle has been received in said receiving space, wherein said auxiliary wheel conversion assembly includes a frame, said frame includes a first longitudinally extending side member along one side of said receiving space, a second longitudinally extending side member along the opposite side of said receiving space, wherein said first and second longitudinally extending side members of said frame each include inwardly converging portions as they extend forwardly, including a first inwardly converging diagonal leg portion extending forwardly of said first longitudinally extending side member beginning at a first side member location, and a second inwardly converging diagonal leg portion extending forwardly of said second longitudinally extending side member beginning at a second side member location, wherein said motorcycle includes a rear drive wheel mounting frame, a first mounting frame member extending longitudinally on one side of said rear drive wheel of said motorcycle, a second mounting frame member extending longitudinally on the other side of said rear drive wheel, a first lug support member secured to said first mounting frame member at a location forward of said rear drive wheel of said motorcycle, a second lug support member secured to said second mounting frame member at a location forward of said rear drive wheel of said motorcycle, a first lug extending laterally from said first lug support member, a second lug extending laterally from said second lug support member, a first lug receiving member secured to said first longitudinally extending side member at said first side member location and positioned inwardly thereof to releasably receive said first lug when said rear drive wheel of said motorcycle is received in said receiving space of said auxiliary wheel conversion assembly, and a second lug receiving member secured to said second longitudinally extending side member at said second side member location and positioned inwardly thereof to releasably receive said second lug when said rear drive wheel of said motorcycle is received in said receiving space of said auxiliary wheel conversion assembly, said lug support members, lugs and lug receiving members being comprised in said releasable connection means, wherein said first and second lug receiving members each comprise a U-shaped bracket having a pocket and an open entrance wall to said pocket, each of said U-shaped brackets being mounted with its said open entrance wall facing forward to receive respective ones of said first and second lugs therein when said rear drive wheel of said motorcycle is moved into said receiving space of said auxiliary wheel conversion assembly.

* * * * *